No. 662,759. Patented Nov. 27, 1900.
C. E. BLUE.
MOLD FOR MANUFACTURING PRESSED AND BLOWN NARROW NECK BOTTLES.
(Application filed Sept. 4, 1900.)
(No Model.)

Witnesses
Geo. E. Frech.
Chas. R. Wright Jr.

Inventor
C. E. Blue,
By A. S. Pattison, Attorney

UNITED STATES PATENT OFFICE.

CHARLES EDWIN BLUE, OF WHEELING, WEST VIRGINIA, ASSIGNOR OF SEVEN-SIXTEENTHS TO ARTHUR G. HUBBARD AND LOUIS V. BLUE, OF SAME PLACE.

MOLD FOR MANUFACTURING PRESSED AND BLOWN NARROW-NECK BOTTLES.

SPECIFICATION forming part of Letters Patent No. 662,759, dated November 27, 1900.

Application filed September 4, 1900. Serial No. 28,942. (No model.)

*To all whom it may concern:*

Be it known that I, CHARLES EDWIN BLUE, a citizen of the United States, residing at Wheeling, in the county of Ohio and State of West Virginia, have invented new and useful Improvements in Molds for the Manufacture of Pressed and Blown Narrow-Neck Bottles, of which the following is a specification.

My invention relates to improvements in molds for the manufacture of pressed and blown narrow-neck bottles, all of which will be fully described hereinafter.

The object of my invention is to provide an upright press-mold for narrow-neck bottles so constructed that a blank is produced from which narrow-neck bottles can be blown with perfectly and uniformly formed bottoms.

Figure 1:
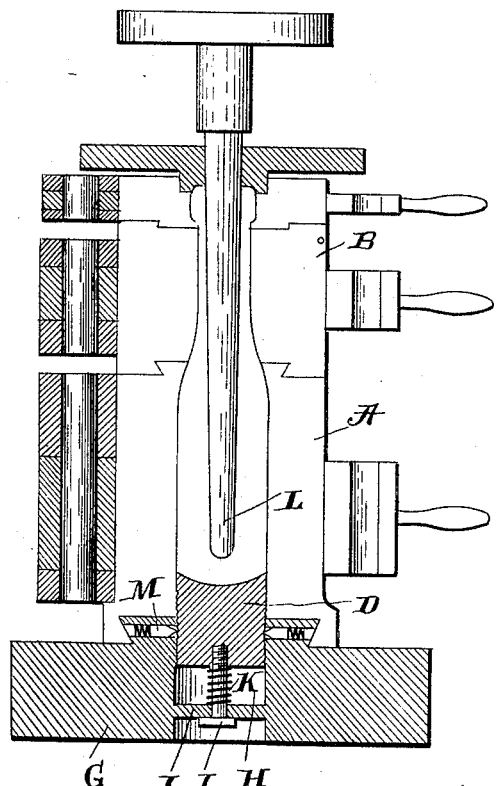
Figure 2:
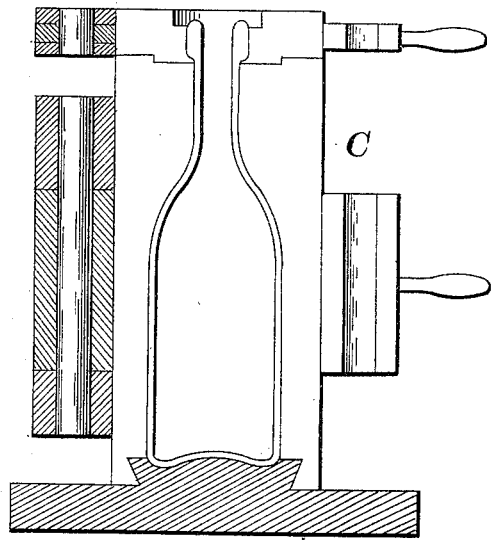
Figure 3:
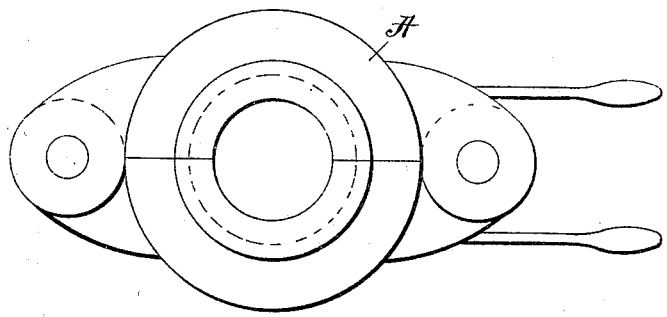

In the accompanying drawings, Figure 1 is a vertical sectional view of my improved press-mold. Fig. 2 is a similar view of the blow-mold in which the pressed blank is blown to its finished form. Fig. 3 is a top plan view of the press-mold with the neck-ring removed.

Referring now to the drawings, A is the lower section of an upright press-mold body, and B the upper section thereof. The two sections have their junction just below the narrow portion of the neck of the mold, and each section is composed of two horizontally-separable portions, preferably hinged, as here shown, whereby the upper section can be opened to expose the upper opened end of the body portion of the mold to permit a sufficient amount of glass to be readily and quickly placed therein which cannot be passed through the mouth of the upper section of the narrow neck of the mold and whereby both the upper and lower sections can be opened to allow the pressed blank to be removed therefrom and be placed in the blow-mold C to be blown to the form of the finished article.

The difficulties heretofore existing in forming pressed and blown narrow-neck ware or bottles with even and uniform bottoms arises from the fact that it is not practical to always place the same amount of glass in the mold at each charging. Owing to this variation in the charge placed in the mold there is a variation in the distance which the plunger can travel within the mold, for the reason that when the mold has become filled the plunger cannot move farther. These difficulties I overcome in the upright mold here shown by providing the mold with a yielding pressure-held bottom, the pressure of which will be sufficient to resist the pressure caused by the movement of the plunger within the mold until the mold has become filled, and then the further movement of the plunger will cause a depression of the pressure-held bottom, thus permitting the plunger to always move a uniform and regular distance within the mold, and thus always form blanks with bottoms of uniform thickness, which when placed in the blow-mold will expand under atmospheric or other suitable pressure evenly and uniformly. By reference to Fig. 1 the means for accomplishing this will be readily understood, and in this figure a downwardly-yielding bottom D is provided, the said bottom being of a diameter equal to the interior diameter of the bottom of the lower section or body A of the mold, and the said bottom has its upper surface concaved to prevent the formation of any sharp lines or seams, which is very essential in the production of a perfectly-formed bottom. The base G, upon which the mold rests, is provided with a cavity or opening H, in which the yielding bottom D moves, and projecting from the movable bottom is a headed bolt or pin I, which passes through a suitable web J, which serves to limit the upward movement of the said bottom. Surrounding the pin or bolt I and having its ends engage, respectively, the under side of the bottom and the upper side of the web J is a suitable spring K. This spring K will be of a sufficient strength to withstand the pressure caused by the movement of the narrow or slender plunger L within the mold until the mold has become filled with the glass and plunger, when the further movement of the plunger will cause the downward movement of the bottom D, and thus permit the plunger to always travel a predetermined and uniform distance within the mold for the purposes heretofore explained.

A suitable catch M is provided for engaging with the notched or roughened surface N of the bottom D, whereby when the bottom has been depressed it will be held in this depressed position until the pressed blank is removed therefrom.

By means of an upright press-mold having a separable narrow neck portion to permit the free access of the molten glass and the body portion of the mold having a yielding bottom I am enabled to produce narrow-neck bottles with evenly and uniformly formed bottoms.

Having thus described my invention, what I claim, and desire to secure by Letters Patent, is—

1. An upright narrow-neck press-mold composed of upper narrow-neck and lower body sections, said sections being separable, and the body-section having a downwardly-yielding bottom under the pressure of the forming operation.

2. An upright narrow-neck press-mold composed of relatively separable upper narrow-neck and lower body sections, the body-section having a downwardly-yielding bottom under the pressure of the forming operation, and of a diameter equal to the diameter of the interior of the lower end of the said body-section.

3. An upright narrow-neck press-mold composed of relatively separable upper narrow-neck and lower body sections, the body-section having a yielding bottom, and a locking member for holding the bottom in its depressed position.

In testimony whereof I have hereunto set my hand in the presence of two subscribing witnesses.

CHARLES EDWIN BLUE.

Witnesses:
WILLIAM BARCLAY JONES,
WM. V. HOGE, Jr.